United States Patent [19]

Olivier

[11] Patent Number: 4,489,249
[45] Date of Patent: Dec. 18, 1984

[54] ELECTRIC MACHINE ROTOR HAVING A LAMINATED AND SEGMENTED RIM

[75] Inventor: Michel Olivier, Danjoutin, France

[73] Assignee: Alsthom-Atlantique, Paris, France

[21] Appl. No.: 478,978

[22] Filed: Mar. 25, 1983

[30] Foreign Application Priority Data

Mar. 26, 1982 [FR] France .................... 82 05163

[51] Int. Cl.³ .................................................. H02K 1/22
[52] U.S. Cl. ...................................... 310/216; 310/269
[58] Field of Search .............................. 310/216–218, 310/261–270

[56] References Cited

U.S. PATENT DOCUMENTS

| | | | |
|---|---|---|---|
| 3,280,355 | 10/1966 | Ruelle et al. | 310/269 |
| 3,307,059 | 2/1967 | Kitano et al. | 310/216 |
| 3,488,754 | 1/1970 | Hohnstein | 310/216 |
| 4,264,836 | 4/1981 | Dukshtau et al. | 310/216 X |

FOREIGN PATENT DOCUMENTS 996919 6/1965 United Kingdom .
1494126 12/1977 United Kingdom .

Primary Examiner—Donovan F. Duggan
Attorney, Agent, or Firm—Sughrue, Mion, Zinn, Macpeak & Seas

[57] ABSTRACT

A larger number of keys (L) are formed in the outer cylindrical surface of a rotor rim than is strictly necessary for fixing pole pieces (P) thereto. The keys are regularly spaced around the rim. This arrangement makes it possible to avoid having adjacent rim segments offset to each other by an angle which is equal to the pole pitch or at best to the half pole pitch as has previously been the case. The overlap between segments may now be at the pitch of the fixing keys. This can be used to increase the overlap factor, thereby increasing the mechanical strength of the rim against centrifugal forces.

5 Claims, 5 Drawing Figures

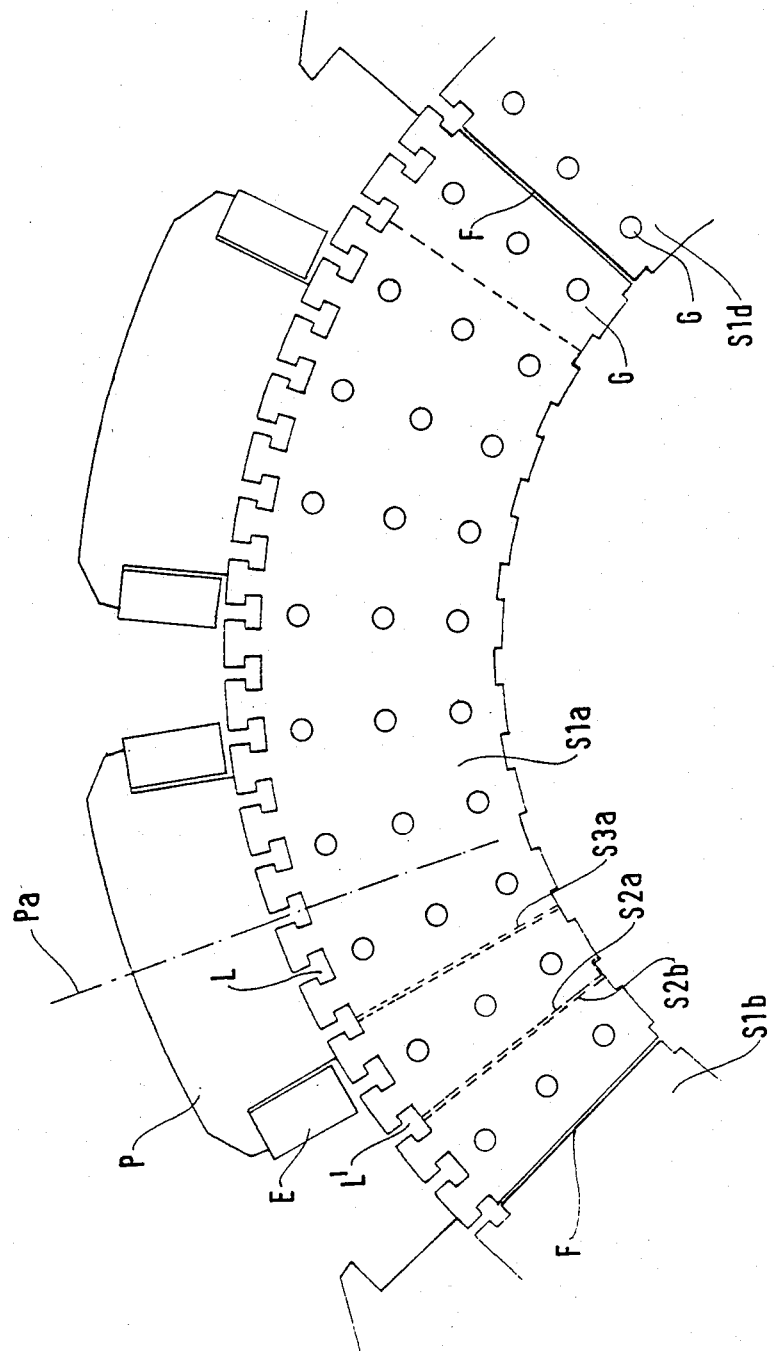

ELECTRIC MACHINE ROTOR HAVING A LAMINATED AND SEGMENTED RIM

The invention relates rotors for synchronous machines having projecting poles, and it relates in particular to the construction of the magnetic circuit of the rotor, called herein the "rim", on which inductive pole pieces are fixed.

BACKGROUND OF THE INVENTION

One well known and cheap solution consists in making the rim out of "segments" of thin magnetic sheet material. Each segment occupies an angular sector of a flat ring, and the segments are obtained by punching out the required shape in a press. The segments are then stacked and juxtaposed to make up an axial succession of complete rings around an axial portion of the rotor. The number of segments round a ring and the angular extents thereof (the segmentation) are determined as a function of the number of pole pieces and of the maximum size of segment that can be punched from the feed stock (may be set by maximum available punch size, by the width of the feed sheet, or by the percentage of waste material that can be accepted). The segments are clamped axially between thicker end segments by means of many tie rods. Providing the completed rotor is transportable to the end site, the rim may be assembled in the factory, otherwise the rotor must be assembled on site.

The resulting rim comprises a large number of lamination layers which are usually 2 to 4 mm thick. Each lamination layer is in the form of a ring having a plurality of segments, each of which extends over an angle corresponding to an integer number of pole pieces (see FIG. 1).

The segments making up the individual rings may comprise single laminations or else a small number of laminations stacked together, but in either case, axially adjacent segments are offset from one another through an angle which is equal to one or more pole pitch steps, or in some case two to one or more half pole pitch steps. The offset is provided to give mechanical strength to the assembly as explained below. The relative angular displacement between axially adjacent segments is refered to herein as the "segment overlap angle".

The inductive pole pieces are fixed to the periphery of the rim by means of T-shaped, dovetailed or otherwise suitably shaped keys. Each pole piece comprises one or more keys. The axes of the keys are all parallel to the axis of the pole piece.

The rim built up in this manner is tubular in form, and when the rotor rotates, the main stress to which it is subjected is tension in the circumferential or tangential direction. This is due to the effects of centrifugal forces acting on the rim itself and also on the pole pieces attached to it.

The radial thickness of the rim determines the cross section of the metal which must withstand said stress. However, the presence of radial gaps between adjacent segments in the same ring make it locally impossible for the rings to transmit said tension. The rim as a whole does not fall apart because the forces are transmitted across the gaps by the combination of two effects: shear in the tie rods; and friction between axially adjacent rings which enables across-gap force to be transmitted through the adjacent rings, provided the rings are offset in such a way that the gaps do not line up. It will thus be understood that when calculations are performed to determine the maximum strength of the rim, these calculations are based on the axial section of the rim which includes the largest possible number of gaps, i.e., on a "plane of weakness". In FIG. 2 which shows the outer surface of a prior art rim developed in the plane of the figure, a plane of weakness is shown as a line P1. The gaps are shown at F. Compared with a rim that does not have any gaps, the useful cross section of metal in the plane of weakness is reduced by the ratio $(p-1)/p$, where p is the ratio of the angular extent of the segments by the minimum possible segment overlap angle. In known rims the ratio p is equal to the number of pole pitch steps per segment, or sometimes to the number of half pole pitch steps per segment.

The ratio $(p-1)/p$ is referred to herein as the "overlap factor". Usually, in large synchronous machines where segmented rims are commonly employed, the number of pole pitch steps per segment is 2, 3, 4 or rarely 5. The corresponding values of the overlap factor are 0.50, 0.66, 0.75 and 0.80.

It can thus be seen that the mechanical size of a rim of this type is directly influenced by the overlap factor, and the feasibility limits for high speed machines lead to segmented rims being replaces by non-segmented or "solid" rims in which each ring is made from a single piece of forged or cast steel.

Such solid rims have the following disadvantages:
(1) they are expensive to manufacture;
(2) the reject rate because of internal defects in the rings can be quite high, thus lengthening the time taken to manufacture the rim;
(3) large scale machining equipment is required; and
(4) the size of the parts may lead to transport difficulties.

Preferred embodiments of the present invention provide a rim made up of segments which are stamped out of a sheet of magnetic material and which are assembled substantially as described, however, by virtue of an increased overlap factor, e.g. 0.90 or more, they enable this type of construction to be used at speeds which previously necessitated solid rims.

SUMMARY OF THE INVENTION

The present invention provides a rotor for an electric machine, said rotor having a laminated rim with pole pieces fixed thereto, said pole pieces carrying electric windings, and said rim occupying a substantially tubular volume between inner and outer co-axial cylindrical surfaces about a shaft and comprising an axially extending stack of plane laminated rings having outer edges which together constitute the outer cylindrical surface of the rim, and inner edges which together constitute the inner cylindrical surface of the rim, wherein:

each ring is constituted by a plurality of segments each extending over an angular sector and following one another round the shaft to make up a substantially complete circular ring with radially extending gaps between adjacent segments, said gaps in any two adjacent rings being angularly offset by a "segment overlap angle" (which angle is not necessarily a constant for all pairs of adjacent rings), said assembly of segments making up the rim being held together by tie rods extending parallel to the shaft and passing through successive rings in the stack to compress the stack axially;

the outer edges of the segments are crenellated by suitably stamping the sheet from which the segment's constituent laminations are made, whereby the outer surface of the assembled rim has axially extending keys for fixing said pole pieces;

the segment overlap angle is chosen in such a manner that two successive rings offset by said angle have matching crenellations so that the keys are continuous along the outer surface of the rim; and the pole pieces extend axially along the rim, projecting from the outer surface thereof, being fixed to a plurality of said keys and succeeding one another at a "pole pitch";

the improvement wherein:

(a) all of said keys are at a regular "fixing" pitch around said outer surface of the rim such that rotating any one ring through said fixing pitch or an integer multiple of said fixing pitch re-aligns the keys in the outer surface of the rim;

(b) more keys are provided than are necessary for fixing the pole pieces, whereby a proportion of the keys along any given rotor rim are not, in fact, used;

(c) the overlap angle is equal to an integer number of fixing pitch steps but is less than a single pole pitch step thereby increasing the rim's strength against tangential forces; and (d) the tie rods are designed to exert sufficient axial compression force to ensure that, when the rotor rotates and applies centrifugal force to the rings, the resulting tangential tension in each ring is transmitted across the gaps between the segments thereof by virtue of the friction forces set up between adjacent rings by said axial compression of the tie rods.

The following features are preferably applied to said rotor:

the overlap angle is less than half the pole pitch;

the fixing pitch is chosen to be equal to a fraction of the overlap angle, and is small enough to enable the number of poles mounted on a rotor to be changed without having to disassemble the rim;

the pole pitch is uniform over the entire circumference of the rim and the fixing pitch is a submultiple of the uniform pole pitch, whereby the axis of each pole piece may be fixed at the same offset relative to the fixing keys as are the other pole pieces, said offset optionally alternating in sign from one pole piece to the next; and the fixing pitch is a submultiple of the pole pitch, whereby the axis of each pole piece may be fixed in a plane of symmetry of the set of keys with which the pole piece is associated.

The segments of each ring may all extend over the same angle or they may extend over different angles, but in either case the segments all have a large number of keys on their outer edge which are suitable for fixing pole pieces, but only a portion of which are actually put to use.

These keys differ from the prior art as follows:

(a) the keys are equidistantly distributed around the entire periphery of the rim, instead of being bunched in symmetrical groups about each pole piece axis;

(b) the keys are all radially disposed, instead of all being parallel within each group to the axis of the corresponding pole piece;

(c) the number of keys is limited only by the minimum possible key spacing as may be determined by pole piece requirements or by the need to meet minimum strength requirements with the rim material. It is thus possible to choose from a wide range of possible segmentation schemes. In particular, it is no longer essential for the number of segments to be a submultiple of the number of poles; and (d) the matching keys on the pole pieces need not necessarily be disposed symmetrically relative to the pole piece axis, nor do all the pole pieces need to be identical. It is thus possible to have various "kits" of pole pieces that are capable of being mounted on the same rim so that different numbers of poles may be mounted on the rim depending on requirements (e.g. the frequency at which the machine is to operate), or so that some poles may be offset.

Thus, to sum up, it has been found that multiplying the number of pole-fixing keys (within certain constraints) makes it possible to have a wide range of choice when it comes to segmentation, while at the same time making a rotor which is capable of rotating at speeds which previously required the use of non-segmented rims.

BRIEF DESCRIPTION OF THE DRAWINGS

An embodiment of the invention is described by way of example with reference to the accompanying drawings, in which:

FIG. 5 is a plan view of a segment in accordance with the invention, with pole pieces shown in place on the segment.

MORE DETAILED DESCRIPTION

Figure 1:
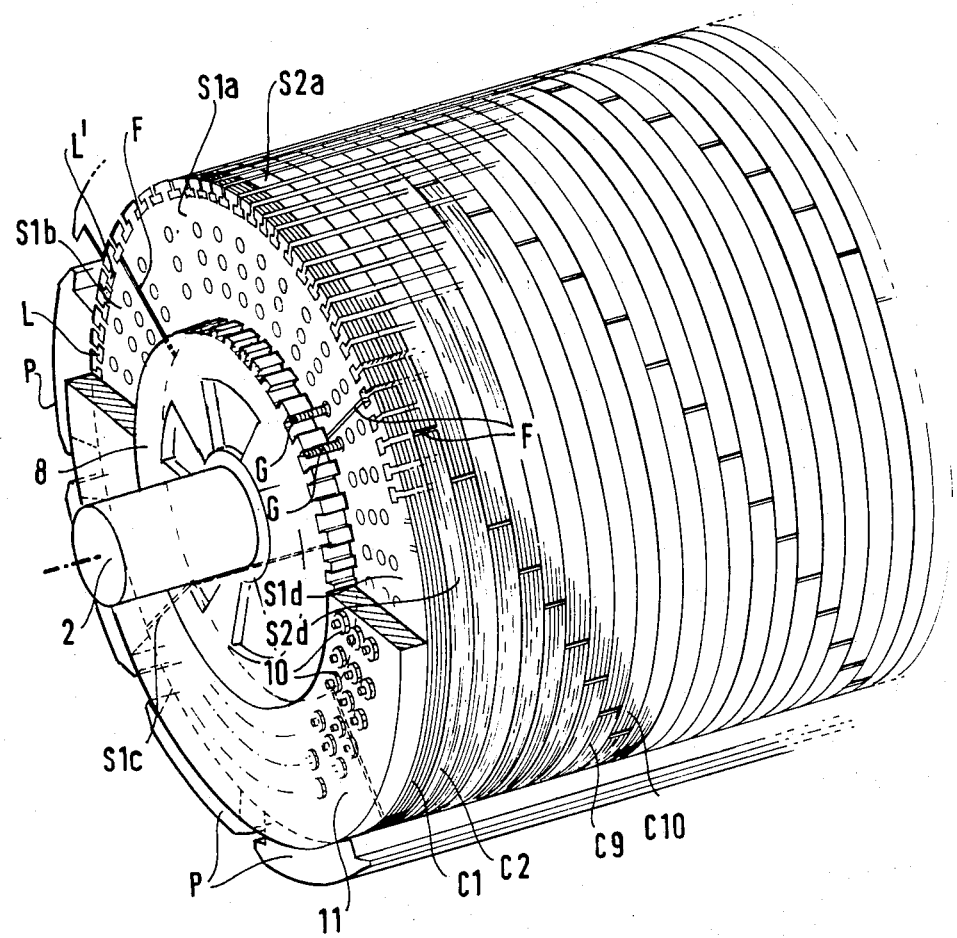
FIG. 1 is perspective view of one end of an electrical machine rotor in accordance with the invention.

FIG. 1 shows the end of a rotor of a synchronous machine such as an alternator intended to deliver a power of 330 MVA at 600 revolutions per minute (rpm) under normal operating conditions, and capable of racing at up to 930 rpm under transient conditions. The magnetic circuit of the rotor comprises ten poles mounted on a rim of segment shaped laminations. The rotor is 3,060 mm long and rotates about a shaft 2. Its rim comprises an axially built up stack of plane laminations in the form of flat rings such as C1, C2, etc. with each ring having an inside diameter of 2,370 mm and an outside diameter of 3,440 mm. The rings are constituted by 2.5 mm thick laminations of steel sheet which are mounted on the shaft 2 by means of a central spider 6 to constitute a rigid assembly. The spider 6 is shown schematically as comprising a set of spokes holding an outer tubular shell 8 which is continuous and to which the laminations are fastened. It will be understood that in practice the spider 6 is of more complex structure, and that, in particular, it is arranged to pass a cooling gas radially through the magnetic laminations of the rim.

Each ring C1, C2, etc. is built up in the longitudinal direction from a plurality of thicknesses of steel lamination, and in the circumferential direction from four segments such as S1a, S1b, S1c, and S1d for the ring C1; S2a, S2b, S2c, and S2d for the ring C2, etc. All the segments in all the rings are identical. Within a single ring, the segments are at 90° intervals and a small gap or slot F is left between successive segments going round the ring. These gaps are advantageously used for a radial flow of cooling gas, such as air, and they should extend axially for about 10 mm to ensure that the cooling gas flows properly. This leads to the rings being built up from 2 to 5 layers of lamination which are not angularly offset relative to one another.

The assembly of segments is made rigid in such a manner that the rim acts mechanically as a single member by means of 120 tie rods G extending parallel to the shaft 2. The tie rods are made of steel alloy type 35 CD4 as defined in French standard AFNOR A-35557 and their elastic limit is about 700 MPa. The ends of the tie rods are fitted with nuts 10 which bear on end plates 11 so that the entire stack of laminations is sandwiched and compressed between the end plates 11 by tightening the nuts 10. If the nuts are tightened so that the tie rods are stressed to 300 MPa, friction between the laminations is sufficient to prevent touching segments from sliding angularly relative to each other under the effect of circumferential tension in the rim due to centrifugal force.

Figure 2:
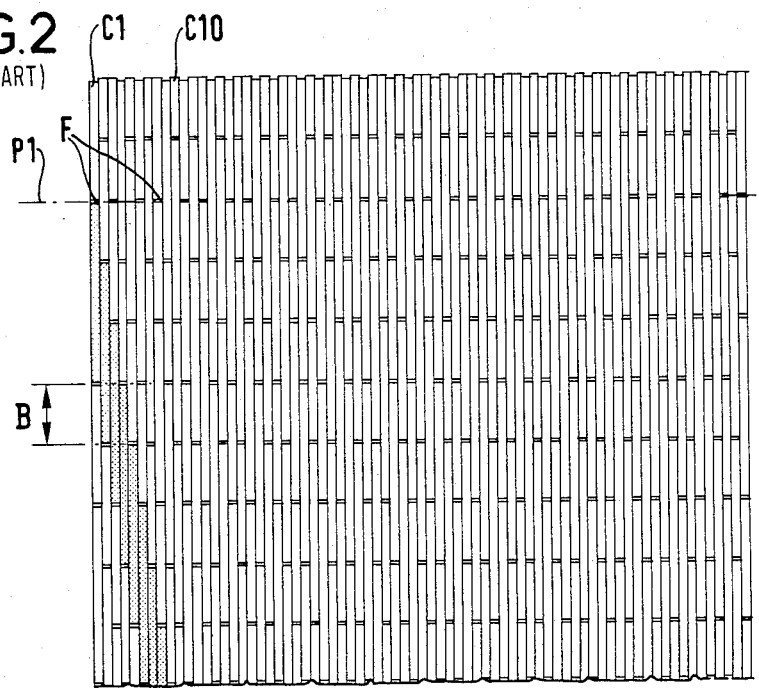
FIG. 2 is a view of a rotor outer surface developed in a plane showing a prior art surface.
Figure 3:
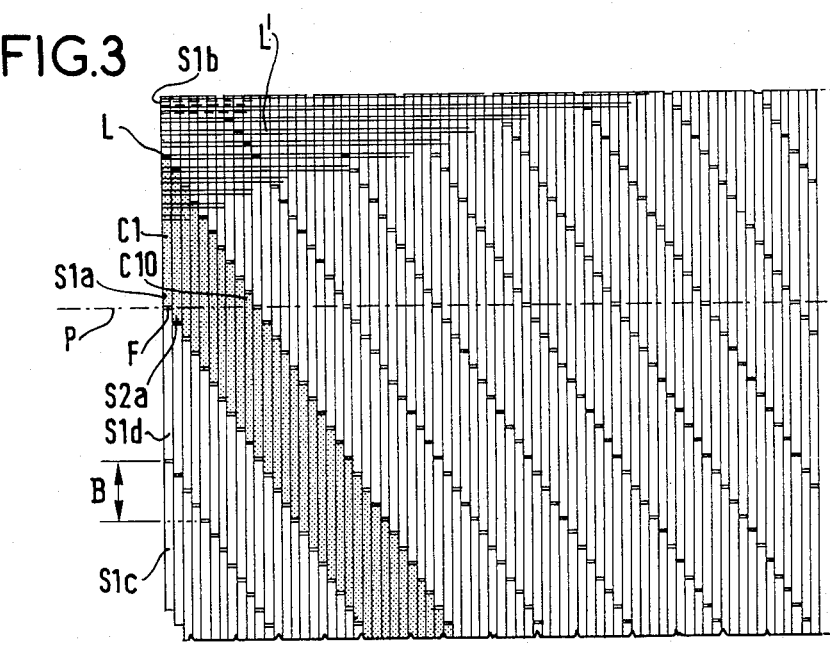
FIG. 3 is a view showing a the surface of a rotor in accordance with the invention, and with both figures being simplified in that the offset is shown as being always in the same direction.

FIGS. 2 and 3 are drawn as though the offsets between adjacent rings were always in the same direction. This makes the figures easier to understand, but it will be understood that, in practice, it is advantageous to reverse the direction of offset periodically so that the gaps between segments make a symmetrical zig-zag pattern on the cylindrical outside face of the rim.

FIG. 2 shows the outside cylindrical surface of a prior art rim developed in the plane of the figure. Each ring comprises two two-pole segments and two three-pole segments, such that a radial plane passing through a gap F, e.g. the plane P1, passes through four gaps F for every ten successive composite rings it passes through.

Figure 4:
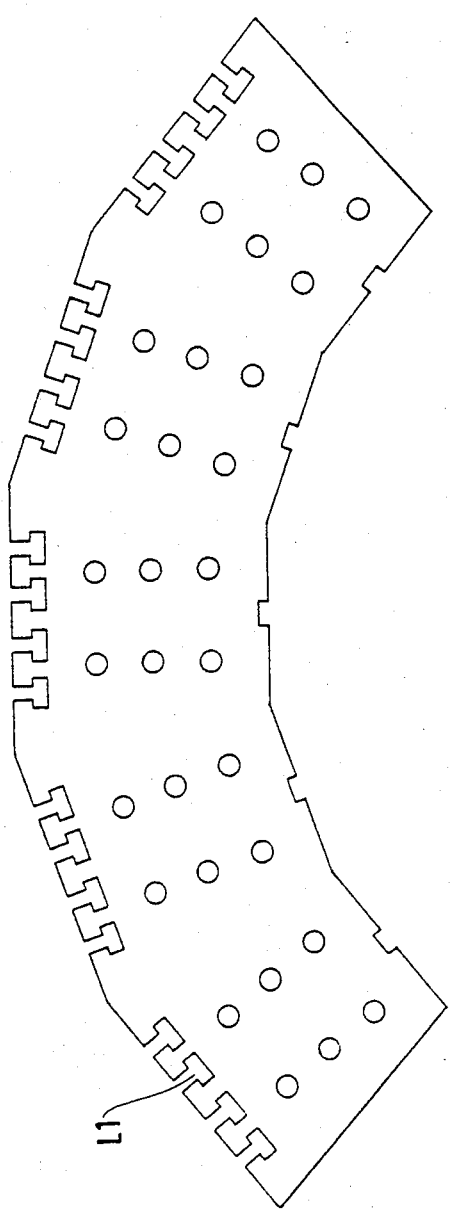
FIG. 4 is a plan view of a prior art segment.

This gives an overlap factor of 0.60. This stems from the fact that the overlap angle between successive rings is equal to the pole pitch, i.e. to 36°, in order to enable each pole to be symmetrically fixed by a group of keys L1 (see FIG. 4). Proposals have been made to increase this low overlap coefficient by fixing the poles in an asymmetric manner, such that pairs of adjacent poles and their fixing keys are symmetrically disposed about an axial plane passing in between the poles. One such known arrangement (not shown) can lead to an overlap angle which is equal to half the pitch of the poles, with each lamination layer having four segments, each of which extends over five half pole pitch angles. This gives an overlap coefficient of 0.80, which would require the rim to weigh 120 metric tons to stand up to the centifugally induced tension. Such an excessive rotor mass leads to the rotor's critical speed for bending being substantially equal to the expected transient "run-away" speeds, making such a rim unusable. Such arrangements have lead, in practice, to the rims of known rotors being made from very expensive single piece laminations.

FIG. 3 shows the developed outside cylindrical surface of a rotor rim in accordance with the present invention. An axial plane P passing through as many gaps F as possible only meets one gap F per group of ten successive rings C. This stems from the following considerations:

There are 10×8=80 keys L around the circumference (see FIG. 5) which are spaced equidistantly; and These are arranged in four segments each having 20 keys and having an overlap angle equal to two keys, thereby giving an overlap coefficient of 0.90. This particular overlap angle has been chosen as a function of the economically feasible axial compression, and on experiments by the inventor to determine the effectiveness of the resulting friction forces.

The rim then has a total mass of 105 metric tons.

The weight saving thus achieved is 15 tons, or 12.5%. In addition to the economic advantage of using less material, this saving is also advantageous in that it provides an adequate margin between the transient "run-away" speeds to be expected and the speed at which bending first becomes critical.

The angular frequency $W_c$ at which bending becomes critical is given by the equation: $W_c 2 = K/M$; where K is the overal stiffness of the system and M is the mass of the rotor.

This means that, in practice, the critical speed can be increased by at least 3%.

The limits up to which segmented rims can be used are determined by mechanical stress which increases with the square of the speed, and by the mass of the rim which is always greater than for a solid rim because of the reduced cross section area for withstanding forces, due both to the gaps between segments and to the tie rods.

A rim in accordance with the present invention enables segmented rims to be used beyond previously attainable limits in situations that have previously required solid rims. This is due both to the reduced mass and to the increased useful cross section through which forces can be transmitted.

I claim:

1. A rotor for an electric machine, said rotor having a laminated rim with pole pieces fixed thereto, said pole pieces carrying electric windings, and said rim occupying a substantially tubular volume between inner and outer co-axial cylindrical surfaces about a shaft and comprising an axially extending stack of plane laminated rings having outer edges which together constitute said outer cylindrical surface of the rim, and inner edges which together constitute said inner cylindrical surface of the rim, wherein:

each ring is constituted by a plurality of segments each extending over an angular sector and following one another round the shaft to make up a substantially complete circular ring with radially extending gaps between adjacent segments, said gaps in any two adjacent rings being angularly offset by a segment overlap angle (which angle is not necessarily a constant for all pairs of adjacent rings), tie rods extending parallel to the shaft and passing through successive rings in the stack to compress the stack axially to hold together said assembly of segments making up the rim;

the outer edges of the segments bearing stamped crenellations of the sheet from which the segment's constitutent laminations are made, whereby the outer surface of the assembled rim has axially extending keys for fixing said pole pieces;

the segment overlap angle is chosen in such a manner that two successive rings offset by said angle have matching crenellations so that the keys are continuous along the outer surface of the rim; and the pole pieces extend axially along the rim, projecting from the outer surface thereof, being fixed to a plurality of said keys and succeeding one another at a pole pitch;

the improvement wherein:

(a) all of said keys are at a regular fixing pitch around said outer surface of the rim such that rotating any one ring through said fixing pitch or an integer multiple of said fixing pitch re-aligns the keys in the outer surface of the rim;

(b) the keys are in excess over that necessary for fixing the pole pieces, whereby a proportion of the keys along any given rotor rim are not, in fact, used;

(c) the overlap angle is equal to an integer number of fixing pitch steps but is less than a single pole pitch step thereby increasing the rim's strength against tangential forces; and (d) the tie rods exert sufficient axial compression force to ensure that, when the rotor rotates and applies centrifugal force to the rings, the resulting tangential tension in each ring is transmitted across the gaps between the segments thereof by virtue of the friction forces set up between adjacent rings by said axial compression of the tie rods.

2. A rotor according to claim 1, wherein the overlap angle is less than half the pole pitch.

3. A rotor according to claim 2, wherein the fixing pitch is chosen to be equal to a fraction of the overlap angle, and is small enough to enable the number of poles mounted on a rotor to be changed without having to disassemble the rim.

4. A rotor according to claim 1, wherein the pole pitch is uniform over the entire circumference of the rim and wherein the fixing pitch is a submultiple of the uniform pole pitch, whereby the axis of each pole piece may be fixed at the same offset relative to the fixing keys as are the other pole pieces, said offset optionally alternating in sign from one pole piece to the next.

5. A rotor according to claim 4, wherein the fixing pitch is a submultiple of the pole pitch, whereby the axis of each pole piece may be fixed in a plane of symmetry of the set of keys with which the pole piece is associated.

* * * * *